Patented June 29, 1926.

1,590,961

UNITED STATES PATENT OFFICE.

RUDOLF SINGER, OF BRNO, CZECHOSLOVAKIA, ASSIGNOR TO KUNSTHARZFABRIK REGAL & CO., OF BRNO, CZECHOSLOVAKIA.

PROCESS FOR THE MANUFACTURE OF ARTIFICIAL RESINS.

No Drawing. Application filed June 17, 1925, Serial No. 37,844, and in Germany May 19, 1925.

My invention relates to a process for the manufacture of resinous condensation products from phenols and formaldehyde which are clear as water. It is well known to produce condensation products from phenols and formaldehyde and such is preferably effected by the use of condensing agents. The object of the present invention is to produce an article of this kind clear as water and such aim is attained by the use of chloraminoaldehydes as condensing agents.

In accordance with my invention I dissolve chloraminoaldehyde in formaldehyde and boil it with the proper quantity of phenol with a reflux cooler for some time. After the reaction is completed and after the removal of the water present the initial condensation product can be converted into the final condensation product by the usual methods.

*Example.*

1, 7 parts by weight of dichloraminoaldehyde are dissolved in 80 parts 40% formaldehyde. 100 parts of phenol are then added and the whole mass is boiled for some time with a reflux condenser. The reaction is rather turbulent in the beginning and is quickly completed. The water is then removed by a distillation in vacuo. The product obtained is clear as water.

In place of dichloraminoaldehyde the monochlorine compounds can also be employed.

What I claim and wish to secure by Letters Patent of the United States is:—

A process for the manufacture of resinous condensation products clear as water by condensing phenols and formaldehyde, consisting in using as condensing agents substances in the class containing chloraminoaldehydes and their derivatives.

In testimony whereof I affix my signature.

RUDOLF SINGER.